United States Patent [19]

Wicke

[11] Patent Number: 4,566,565

[45] Date of Patent: Jan. 28, 1986

[54] SELF-PRESSURIZED DAMPER

[75] Inventor: Brian G. Wicke, Bloomfield Hills, Mich.

[73] Assignee: General Motors Corporation, Detroit, Mich.

[21] Appl. No.: 605,628

[22] Filed: Apr. 30, 1984

[51] Int. Cl.$^4$ .............................................. F16F 9/43
[52] U.S. Cl. ............................ 188/322.21; 188/322.5
[58] Field of Search ................... 188/269, 315, 322.21, 188/322.5

[56] References Cited

U.S. PATENT DOCUMENTS

| | | | |
|---|---|---|---|
| 2,774,446 | 12/1956 | de Carbon | 188/317 X |
| 3,024,875 | 3/1962 | Stultz | 188/88 |
| 3,750,855 | 8/1973 | Peddinghaus | 188/269 |
| 3,945,663 | 3/1976 | Duckett | 188/315 |

FOREIGN PATENT DOCUMENTS 86644  5/1982  Japan ............................... 188/322.21

OTHER PUBLICATIONS

Bilstein Brochure (printed Aug. 1983).
Brake & Front End, Jul. 1982, pp. 17 and 18.

Primary Examiner—Duane A. Reger
Attorney, Agent, or Firm—Lawrence B. Plant

[57] ABSTRACT

A method of self-pressurizing a piston-and-rod type hydraulic damper by means of an internally generated gas including the steps of positioning in the damper a volatile condensed phase of the pressurizing gas contained under pressure within a rupturable capsule and replacing the capsule after the damper is filled and sealed. Heat softenable capsules containing Freon, or the like, are disclosed.

4 Claims, 4 Drawing Figures

U.S. Patent   Jan. 28, 1986   4,566,565
Fig.1
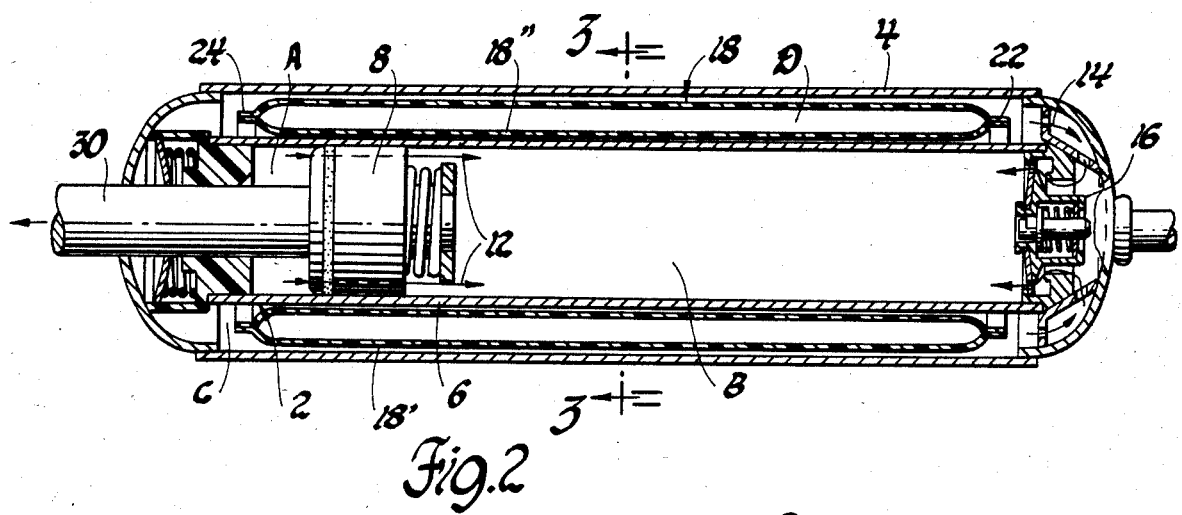
Fig.2
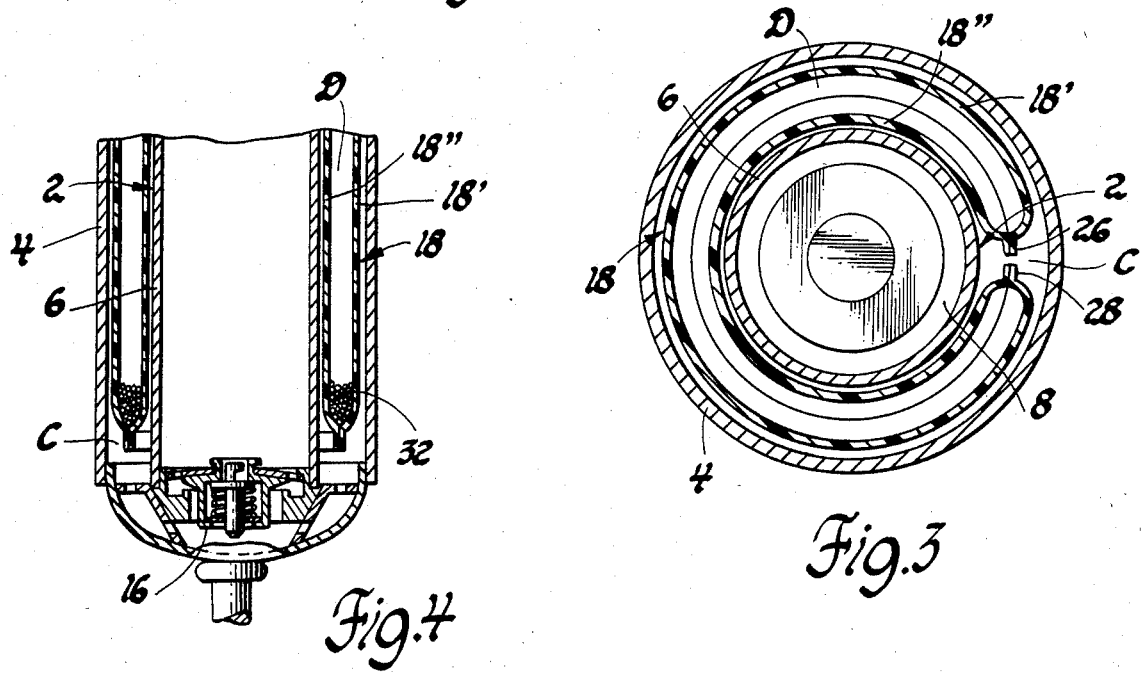
Fig.4
Fig.3

SELF-PRESSURIZED DAMPER

This invention relates to a method of making self-pressurized, hydraulic, shock dampening devices (e.g., automobile shock absorbers or shock dampening struts) of the piston-and-rod type.

BACKGROUND OF THE INVENTION

A typical piston-and-rod type hydraulic shock dampening device (hereafter damper) comprises essentially (1) a working cylinder filled with hydraulic fluid (hereafter oil), (2) and a gas-charged reservoir adjacent the working cylinder which receives and dispenses oil from and to the working cylinder during the damper's compression and rebound strokes respectively. The working cylinder comprises a damping, rod-carrying piston axially slidable within a close fitting surrounding tube. The piston has appropriate passages therethrough, and damping valves therein, which control the flow of oil from one side of the piston to the other as it reciprocates within the tube. One end of the working cylinder is sealed shut and about the piston rod while the other end communicates with the reservoir to permit oil to shuttle back and forth between the working cylinder and the reservoir as required. The reservoir, contains a pocket of cushioning gas which compresses during the damper's compression stroke and expands during the damper's rebound stroke in order to accommodate the otherwise incompressible oil flowing from and to the working cylinder. The expansion and compression of the gas cushion also accommodates the expansion and contraction of the hydraulic oil at various temperatures. In so-called "single tube" dampers, the reservoir is aligned axially with the working cylinder and is usually defined by a simple extension of the same tube that defines the working cylinder. In so-called "double tube" dampers, the working cylinder is surrounded by a radially spaced second tube (known as the reservoir tube) and the annular space therebetween becomes the reservoir.

It is known to physically separate the oil from the cushioning gas in the reservoir in order to prevent the gas from aerating and foaming the oil. In this regard, aeration of the oil with cushioning gas is the primary cause of a condition known as "lag" which is lost motion occurring in the damping piston due to the presence of compressible hydraulic fluid (i.e., the aerated oil) in the working cylinder. One manufacturer (i.e., of single tube dampers), positions a floating piston between the gas pocket and the oil in the reservoir to isolate one from the other. Other manufacturers package the cushioning gas in a hermetically sealed, gas-filled bladder which is submerged in the oil in the reservoir. One such bladder-containing damper of the double-tube type is disclosed in Stultz U.S. Pat. No. 3,024,875, which is assigned to the assignee of the present invention and is specifically incorporated herein by reference. Generally speaking Stultz discloses a Freon-filled bladder made from thin nylon or Mylar sheets sealed together along their edges. Assemblywise, Stultz's bladder is: filled with approximately one atmosphere (i.e., room temperature and rod extended) of Freon; curled; and inserted into the reservoir tube. Thereafter, the working cylinder is inserted into the center of the curled bladder and oil poured to overflowing into both the cylinder and the reservoir. The cylinder and reservoir tubes are then capped and welded closed. The cap for the working cylinder includes appropriate passages and valving for communication with the surrounding reservoir. In more recent years $SF_6$ gas has been used in place of Freon.

It is also known to pressurize the cushioning gas pocket to superatmospheric pressures ranging from about 2 to about 20 atmospheres. Pressurization helps to reduce lag due to reservoir gas-oil mixing (i.e., in bladderless dampers) and also reduces a condition known as "cavitational" lag which otherwise occurs in both bladder-type and bladderless dampers. Cavitational lag results from vaporization of the oil in the damper and subsequent aeration of the oil with the oil vapor. Superatmospheric pressurization not only reduces the amount of vapor that is formed but also so shrinks the size of the bubbles that are formed as to render them virtually harmless, lag-wise. Finally, superatmospheric pressurization imparts gas-spring characteristics to the damper which supplement the primary springs of the vehicle for improved control and handling of the vehicle.

A number of techniques for superatmospherically pressurizing dampers are known. One technique, for example, charges a single tube damper (i.e., with axially aligned reservoir and a floating oil-gas separating piston) by means of a special fixture sealingly secured to the open end of the tube defining the cylinder and reservoir. The fixture holds the floating and working pistons away from the mouth of the tube while the cushioning gas is pumped into the tube to a predetermined first pressure. Thereafter: (1) the floating and working pistons are pushed into the tube to compress the gas to a second predetermined working pressure; (2) the operating oil is pumped in behind the working piston; (3) the tube is sealed closed; and (4) the special fixture is removed. Another technique fully assembles a bladderless double-tube damper and then pressurizes it by: piercing the reservoir tube; injecting the cushioning gas under pressure into the reservoir; and finally welds shut the pierced hole. Still another technique (i.e., for bladder-type, double-tube dampers) provides a special sealable fitting through the wall of the reservoir tube and the bladder through which cushioning gas is pumped into the bladder from an external source after the damper has been filled and sealed (e.g., see Duckett U.S. Pat. No. 3,945,663).

U.S. patent application Ser. No. 605,582 filed concurrently herewith in the names of Robert D. Wight and Carlyle H. Wokasien is assigned to the assignee of the present invention and describes a technique for self-pressurizing dampers. That technique is particularly useful to pressurize bladder-type dampers such as Stultz U.S. Pat. No. 3,024,875 (supra) where the bladder is completely submerged in the reservoir oil so as to be incommunicado the outside of the damper. Wight et al describes the in situ, self-pressurization of a gas-charged hydraulic damper to superatmospheric pressure (i.e., at room temperature) by positioning a dormant gasifiable substance(s) in the damper's reservoir (with or without a bladder) which substance, when activated undergoes a chemical or physical change to generate a superatmospheric pressure of a noncondensible gas inside the damper. The substance(s) remain dormant (i.e., in the liquid or solid state(s)) until after the damper is filled with oil and sealed shut, and is thereafter activated by the application of external energy (e.g., heat) to the damper.

It is an object of the present invention to provide an improved Wight et al-type self-pressurization process by utilizing a low-boiling gasifiable substance contained under pressure within a rupturable capsule and rupturing the capsule to liberate and vaporize the substance and thereby pressurize the reservoir's gas pocket following assembly of the damper. This and other objects and advantages of the present invention will become more readily apparent from the detailed description thereof which follows.

BRIEF DESCRIPTION OF THE INVENTION

The present invention comprehends a method for the in situ, self-pressurization of a gas-charged hydraulic damper by: positioning in the damper's reservoir (i.e., with or without a bladder) a volatile substance which is a condensed phase (i.e., solid or liquid) of the charging gas and which is contained under pressure in a rupturable capsule(s); and, subsequently rupturing the containment capsule(s) to remove the containment pressure, liberate the volatile substance for vaporization and superatmospherically pressurize the reservoir with its vapor after the damper has been filled and sealed shut. The volatile substance has a boiling point which is below the lowest anticipated operating temperature of the damper so as to be substantially noncondensible in service. In this regard, the term boiling point is used herein to mean the temperature at which the vapor pressure of the volatile substance is slightly greater than the total pressure in the reservoir and hence will include the sublimation temperature of substances which vaporize directly from the solid state without an intermediate liquid transition phase.

The volatile substance may be sublimable solids such as dry ice or $SF_6$ or liquids such as the fluoronated hydrocarbon (i.e., Freons) refrigerants or the like. The substances will preferably comprise larger molecule materials which have boiling points below about $-40°$ F. In this regard, the larger molecules are easier to contain in bladders otherwise permeable to smaller molecule. Particularly preferred fluoronated hydrocarbons for higher pressure applications include trifluoromonochloromethane (Freon 13), difluoromonochloromethane (Freon 22), and monobromotrifluoromethane (Freon 13 B1). Trichloromonofluoromethane (Freon 11), dichlorodifluoromethane (Freon 12), and dichlorotetrafluoroethane (Freon 114) are acceptable for the lower pressure (i.e., below about 70 psi) applications.

Enough volatile substance is provided in the capsule to fill the reservoir's gas pocket with at least about 0.08 mole of vapor per liter of pocket volume (i.e., at room temperature) so as to raise the room temperature pressure in the pocket to at least about 2 atmospheres and upwards to as much as about 10 atmospheres.

The volatile substance is contained under pressure in a separate capsule(s) (e.g., microcapsules) which is/are subsequently ruptured to remove condensing pressure and liberate the substance for vaporization and consequent pressurization of the reservoir's gas pocket. While any frangible capsule could be used which could be ruptured by increased internal pressure of mechanical action (e.g., high frequency vibration), the capsule(s) will preferably comprise materials which first soften and then rupture within the damper. Heat softenable materials such as hard or soft cellulose acetate, hard or soft cellulose acetate-butyrate, rigid polyvinylchloride-vinyl acetate or the like are most preferred. Such materials will soften when the damper is heated. At the same time the vapor pressure exerted by the contained substance increases the pressure within the capsule. The damper is then heated sufficiently (i.e., time and temperature) to so soften the capsule and elevate the vapor pressure to the point where the capsule bursts resulting in complete vaporization of the substance and pressurization of the gas pocket. Heat softenable capsules are effective for use with both bladder-type and bladder-free dampers. In bladder-free dampers where the gas pocket is in direct contact with the hydraulic fluid, the capsule could be softened by the solvent of plasticizing action of the hydraulic fluid (especially at elevated temperatures). In this regard, cellulose acetate-butyrate or PVC-vinyl acetate capsules have poor chemical resistance to hydraulic fluids containing aromatic hydrocarbons.

DETAILED DESCRIPTION OF A SPECIFIC EMBODIMENT OF THE INVENTION

FIG. 1 depicts, in partial section, a prior art, bladder-type, double-tube shock absorber with its working piston near the end of its compression stroke;

FIG. 2 depicts the shock absorber of FIG. 1 with its working piston near the end of its rebound stroke;

FIG. 3 is a section taken in the direction 3—3 of FIG. 2; and

FIG. 4 is a partial view of a shock absorber like that shown in FIG. 2 depicting one embodiment of the present invention.

FIGS. 1-3 depict a simple, bladder-type, double-tube shock absorber comprising essentially a working cylinder 2, a surrounding reservoir tube 4 and an annular reservoir chamber C therebetween, and will serve to illustrate the basic structure and operation of gas-charged hydraulic dampers in general. The working cylinder 2 comprises a tube 6 defining working chambers A and B which are separated one from the other by a damping piston 8. Damping piston 8 contains appropriate internal passages and damping valves (not shown) for controlling the flow of hydraulic oil between chambers A and B as indicated by the arrows 10 and 12. In FIG. 1 the working piston 8 is shown near the end of its compression stroke and the arrows 10 show the oil flowing from the compression control chamber B through the piston 8 into the rebound control chamber A. Any excess oil in the compression control chamber B is forced into the reservoir chamber C (see arrows 14) via an appropriate valving arrangement 16 at the end of the working cylinder 2. The reservoir chamber C contains a substantially atmospherically pressurized bladder 18 which defines a cushioning gas pocket D such as described in Stultz supra. During the compression stroke the gas cushion D is compressed to accommodate the oil flowing into the reservoir C from the cylinder 2. The bladder 18, here depicted, comprises simply two sheets of gas impermeable plastic 18' and 18" which are heat sealed together along their edges 22, 24, 26 and 28. During assembly, the bladder is curled to fit inside the reservoir tube 4 and the working cylinder 2 thereafter inserted into the center of the curled bladder 18. The working cylinder and reservoir C are then completely filled with oil so that the atmospherically pressurized bladder 18 is totally immersed within the hydraulic fluid in the reservoir C and has no means for communicating with the outside of the shock absorber (i.e., incommunicado the ambient).

FIG. 2 shows the shock absorber of FIG. 1 near the end of its rebound stroke wherein the rod 30 attached to the piston 8 is in substantially its fully extended position. As the piston 8 moves through its rebound stroke, oil from the rebound chamber A flows through the piston 8 into the compression chamber B as indicated by the arrows 12. At the same time, the excess hydraulic oil earlier dumped into the reservoir C during compression is now returned to the compression chamber B via the valving arrangement 16 due to the force exerted by expansion of the gas in the cushioning gas pocket D earlier compressed in the compression stroke.

FIG. 4 illustrates a prior art damper like that shown in FIGS. 1-3 which is provided with a superatmospherically self-pressurizable bladder in accordance with the present invention. The shock absorber is assembled in substantially the same manner as dampers having atmospherically pressurized bladders but wherein the bladder 18 also contains a plurality of heat softenable capsules 32 (e.g., microcapsules) each containing a highly volatile substance (e.g., $SF_6$) under pressure which when freed from its containing capsule vaporizes to fill the bladder 18 and pressurize the shock absorber. Alternatively, fewer larger capsules may be substituted for the many smaller ones. Indeed even a single much larger capsule is acceptable. The use of many small standarized capsules, however, is preferred as it permits shock absorbers to be made with many different pressures and/or many different gas-pocket sizes by merely adjusting the number of standard-sized capsules used for each individualized application.

In one example of the process, a double tube shock absorber of the type shown essentially in FIGS. 1-3 is self-pressurized to about 10 atmospheres as follows. The shock absorber is assembled with a 25 cc air-filled nylon bladder (i.e., one atmosphere at room temperature) containing a spherical, Freon-filled, rigid PVC/vinyl acetate capsule. The capsule has an inside diameter of about 6mm, a wall thickness of about 0.18 mm and contains 1 cc (0.9 gram) of liquid Freon-22. After filling with hydraulic fluid and sealing shut, the device is heated in an oven sufficiently to elevate the temperature inside the bladder to about 200°0 F. and held thereat sufficiently long to burst the capsule from within and thereby liberate the Freon. Comparable dampers may be similarly self-pressurized with 1.5 grams of $SF_6$ or Freon R13 B1 contained in a soft cellulose acetate capsule having a wall thickness of about 0.36 mm or a soft cellulose acetate/butyrate capsule having a wall thickness of about 0.42 mm. In the aforesaid examples, capsule wall thickness have been selected to provide approximately 200 psi room temperature burst strength but may vary considerably depending on the handling and storage stability sought for the filled capsules before use.

While the invention has been described primarily in terms of a bladder-type, double-tube shock absorber, it is to be understood that the principals involved therein are equally applicable to pressurized dampers of the bladder-free (with or without a free-floating piston between the reservoir oil and the gas pocket) and single-tube type as well. Hence the invention is not limited to the specific embodiments described herein but rather only to the extent set forth hereafter in the claims which follow.

The embodiments of the invention in which an exclusive property or privilege is claimed are defined as follows:

1. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement wherein:
    said substance comprises a volatile condensed phase of said gas which is contained under pressure within a rupturable capsule; and
    rupturing said capsule to vaporize said substance to generate said gas.

2. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement wherein:
    said substance comprises a volatile condensed phase of said gas which is contained under pressure within a softenable capsule; and
    softening said capsule such that the vapor pressure exerted by said substance ruptures said capsule thereby liberating said substance to pressurize said pocket with its vapor.

3. In a method of forming a self-pressurized, hydraulic damper having a working cylinder in flow communication with an adjacent hydraulic fluid reservoir containing a cushioning gas pocket, said method including the principal steps of positioning a dormant gasifiable substance in the reservoir and activating the substance, after assembly of the damper, to generate at least 2 room temperature atmospheres of noncondensible gas in said pocket, the improvement wherein:
    said substance comprises a volatile condensed phase of said gas which is contained under pressure within a heat softenable capsule; and
    heating said damper to so soften said capsule and increase the vapor pressure of said substance as to rupture said capsule, liberate said substance and pressurize said pocket with its vapor.

4. A method according to claim 1, 2 or 3 wherein said capsule is contained within a pressurizable bladder which is substantially impervious to said gas and said substance is selected from the group consisting of $SF_6$ and fluorocarbons having a boiling point less than about −40° F.

* * * * *